Aug. 12, 1947.  R. STOVER  2,425,444
CLAMP FOR GAUGE HOUSINGS
Filed Nov. 25, 1944  2 Sheets-Sheet 1
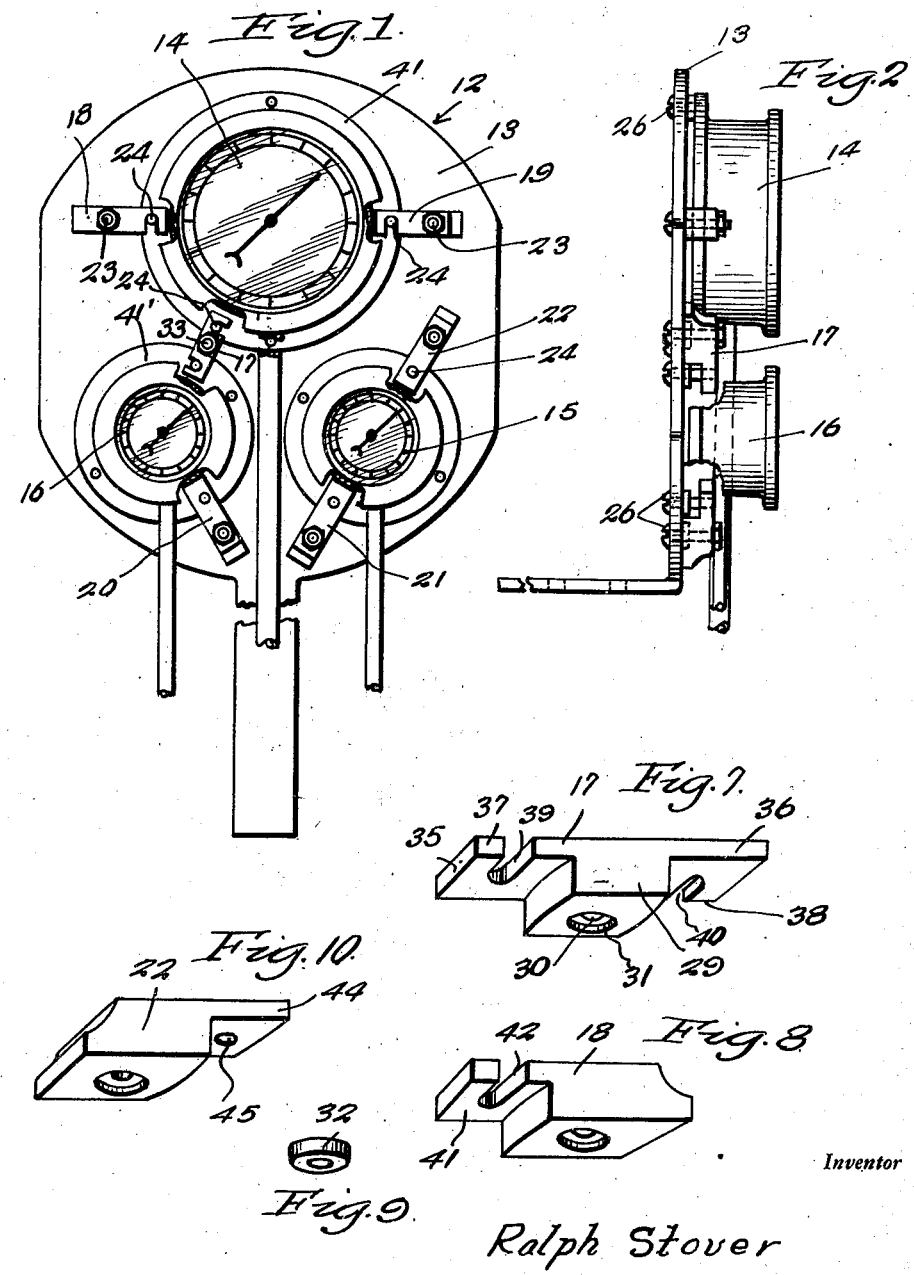
Inventor
Ralph Stover
By Clarence A. O'Brien
and Harvey B. Jacobson
Attorneys Aug. 12, 1947.  R. STOVER  2,425,444
CLAMP FOR GAUGE HOUSINGS
Filed Nov. 25, 1944  2 Sheets-Sheet 2
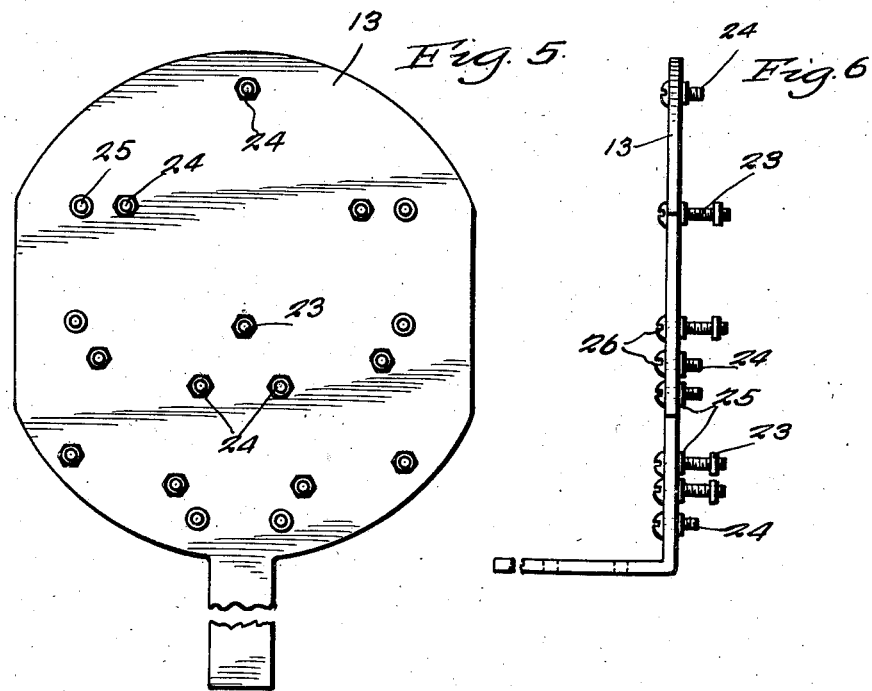
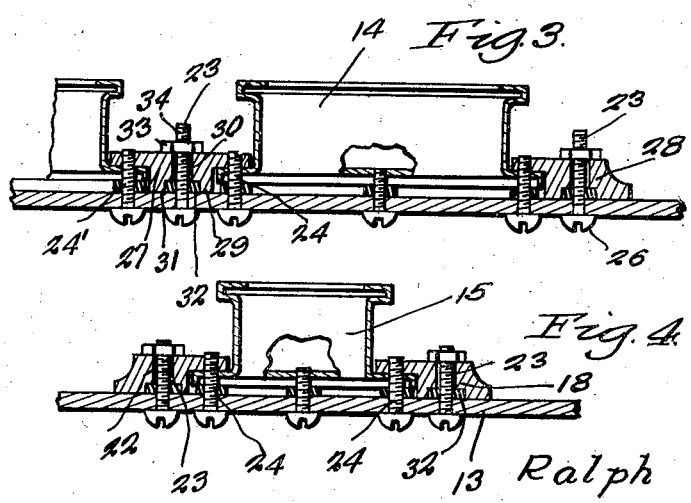
Inventor
Ralph Stover,
By
Attorneys Patented Aug. 12, 1947

2,425,444

UNITED STATES PATENT OFFICE 2,425,444

CLAMP FOR GAUGE HOUSINGS

Ralph Stover, Oelwein, Iowa

Application November 25, 1944, Serial No. 565,131

2 Claims. (Cl. 248—27)

This invention relates to locomotive gauges and has for its object to provide a quick means of mounting gauges such as used in a locomotive boiler head.

Another object of the invention is to provide a swivel clamp for engaging and securing the housings of one or more locomotive gauges to a panel on a locomotive boiler.

A further object of the invention is to provide a bolt and clamp combination for securing a gauge housing to a locomotive gauge panel.

Other features and advantages will become more readily apparent from the following description and the accompanying illustrative drawings in which:

Figure 1 is a front elevational view of a locomotive gauge panel showing gauges secured thereto with my clamping means, Figure 2 is a side elevational view thereof, Figure 3 is a section on line 3—3 of Figure 1, Figure 4 is a similar section illustrating a modified form of the invention.

Figure 5 is a front elevational view of Figure 1, the gauges being removed,

Figure 6 is an edge view of a panel embracing certain elements of my invention,

Figure 7 is a perspective view of one form of a clamp element,

Figure 8 is a similar view of another form of the device,

Figure 9 is a perspective view of a washer used in connection with my clamp, and Figure 10 is a perspective view of another form of clamp.

Like reference characters indicate like parts throughout the following specification and in the several views in the drawings and in which 12, is an elevational view of my device which includes a gauge panel 13, which in this instance embraces three gauges 14, 15, and 16, which are attached to the board by means of clamps 17, 18, 19, 20, 21, and 22, respectively. It will be noted from Figures 5 and 6 that the board 13, is provided with a plurality of especially arranged bolts 23 and 24, the latter being shorter than the former. These bolts are secured to the panel 13, by internally screw threaded rings 25, the heads 26, of the bolts being on the rear side of the panel, this being important.

Pivotally mounted on the bolts 23, are clamp members 17 and 18, each having a depending body portion 29, through the center of which is a bore 30, having an enlarged countersink 31, to receive a pivot washer 32. The member 17, is held in place by a nut 33, on the threaded end 34, of the bolt 23. The member 17, is provided with wings 35 and 36, into the opposing edges 37 and 38 of which are cut-outs 39 and 40, which are adapted to be swung around over the bolts 24 and 24' respectively, which project through the flange 41, of said gauges. When the wings are set over flange bolts 24 and 24' the nut 33 is tightened down and the gauges are secured in place.

Where it is unnecessary to use a double hooked clamp member I use one such as 18, provided with only one wing 41, with its cut-out 42. In some instances I use a member 22, with a wing 44, having a bore 45, to seat down over a bolt 24.

When it is understood that the present method of securing gauges to boiler panels of locomotives is by placing the bolts head out (which is necessary as no provision is made for turning a nut from the outside due to the fact that the bolt must go through the relatively narrow rim 41, of a gauge casing and a nut could not be turned thereon further such a nut would be disfiguring to the appearance of the gauge) and screwing the nuts on from the rear, which is seated close to the boiler, the advantage of my manner of securing the gauges will readily be seen, for when it becomes necessary to remove the gauges for inspection (which is frequent) or repairs, the inner nuts must, as a rule, be cut off because of the close space between the panel and boiler and in most instances burned off. This operation is a tedious one and requires a considerable time. In my device it only becomes necessary to loosen nuts 33, from the outside of the panel and swing the clamps around to disengage the bolts 24, whereupon the gauges may be lifted off the panel. To replace them the operation is reversed.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to, in actual practice, if desired.

Having now described my invention that which I claim as new is:

1. On an instrument board, means for fixing instruments on said board, said means including a series of bolts fixed to said instrument board, certain of said bolts projecting through apertured casing flanges of said instruments, clamp members pivotally seated on certain other of the first bolts to secure said instruments to the board.

2. In a device of the kind described, means for fixing instruments to an instrument panel wherein said means comprises a series of bolts fixed to said panel, certain of said bolts projecting through aperture in the casing flanges of said instruments, and clamp members pivotally seated on certain other of the bolts and having means for engaging the first bolts to secure said instrument to the board, said means comprising notches in the opposite edges of the clamp member, whereby two of said first bolts may be engaged by the clamp member.

RALPH STOVER.

REFERENCES CITED

The following references are of record in the file of this patent:

UNITED STATES PATENTS

| Number | Name | Date |
|---|---|---|
| 1,407,751 | Jeffers | Feb. 28, 1922 |
| 1,738,639 | Champion | Dec. 10, 1929 |
| 1,835,728 | Urfer | Dec. 8, 1931 |
| 1,382,741 | Pierson | June 28, 1921 |

FOREIGN PATENTS

| Number | Country | Date |
|---|---|---|
| 161,433 | Great Britain | Apr. 14, 1921 |